(12) United States Patent
Bales et al.

(10) Patent No.: US 9,236,984 B1
(45) Date of Patent: Jan. 12, 2016

(54) DETERMINATION OF FREQUENCY BAND INFORMATION BY A WIRELESS COMMUNICATION DEVICE

(71) Applicant: Sprint Communications Company L.P., Overland Park, KS (US)

(72) Inventors: Stephen R. Bales, Lee's Summit, MO (US); Kanwar-Preet Singh Jolly, South Riding, VA (US); Maneesh Gauba, Overland Park, KS (US); Mark A. Moore, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 121 days.

(21) Appl. No.: 14/151,640

(22) Filed: Jan. 9, 2014

(51) Int. Cl.
  *H04H 20/71* (2008.01)
  *H04L 5/00* (2006.01)
(52) U.S. Cl.
  CPC .................................... *H04L 5/0042* (2013.01)
(58) Field of Classification Search
  None
  See application file for complete search history.

(56) References Cited

U.S. PATENT DOCUMENTS

| | | | |
|---|---|---|---|
| 2002/0181617 A1* | 12/2002 | Carleton ....................... | 375/316 |
| 2007/0242599 A1* | 10/2007 | Gorday et al. ................ | 370/208 |
| 2008/0089443 A1* | 4/2008 | Sanada et al. ................. | 375/319 |
| 2008/0279292 A1* | 11/2008 | Tanabe et al. ................. | 375/260 |
| 2009/0034486 A1* | 2/2009 | Takahashi et al. ............ | 370/335 |
| 2009/0202010 A1* | 8/2009 | Fu et al. ....................... | 375/260 |
| 2009/0257517 A1* | 10/2009 | Nordstrom et al. ........... | 375/260 |
| 2010/0265913 A1 | 10/2010 | Gorokhov et al. | |
| 2011/0206105 A1* | 8/2011 | Lin et al. ....................... | 375/224 |
| 2011/0211489 A1* | 9/2011 | Chung et al. .................. | 370/252 |
| 2013/0044725 A1* | 2/2013 | Chun et al. .................... | 370/329 |
| 2014/0064418 A1* | 3/2014 | Astrachan ..................... | 375/344 |

* cited by examiner

*Primary Examiner* — Gregory Sefcheck
*Assistant Examiner* — Jael Ulysse

(57) ABSTRACT

A wireless communication device to facilitate determination of frequency band information comprises a processing system and a wireless communication transceiver. The processing system is configured to identify a carrier frequency stored within the wireless communication device and determine a direct current (DC) subcarrier associated with the carrier frequency. The wireless communication transceiver is configured to synchronize with the DC subcarrier to obtain channel information, wherein the channel information comprises a channel size and a DC subcarrier offset. The processing system is configured to process the DC subcarrier with the DC subcarrier offset to determine a starting frequency of a frequency band associated with the carrier frequency.

17 Claims, 5 Drawing Sheets

DETERMINATION OF FREQUENCY BAND INFORMATION BY A WIRELESS COMMUNICATION DEVICE

TECHNICAL BACKGROUND

Wireless communication devices transmit and receive information wirelessly via a wireless access node to communicate over a communication network. Typically, the wireless access node is part of a radio access network (RAN) which provides the wireless communication devices with access to further communication networks, systems, and devices. The wireless communication devices utilize "forward link" or "downlink" communication channels to receive voice and/or data transmitted from the wireless access node, and "reverse link" or "uplink" communication channels to transmit information up to the node.

In fourth generation (4G) long term evolution (LTE) communication systems, a wireless communication device is referred to as user equipment (UE), while a wireless access node is called an enhanced Node B (eNodeB). In LTE systems, when the UE is first powered on, the initial connectivity for the UE requires it to synchronize with the network as a first step in gaining access to network resources. Each UE typically has carrier frequencies associated with different geo locations stored within it that are used by the UE to synchronize with a particular cell served by an eNodeB. Typically, the UE selects an appropriate carrier frequency and discovers its associated direct current (DC) subcarrier, which is assumed to be centered in the frequency band. The UE then receives the channel size from an overhead message broadcast in an acquisition channel of the band. The UE can then calculate the extent of the licensed frequency band using the channel size and the centered DC subcarrier frequency.

Overview

A method of operating a wireless communication device to facilitate determination of frequency band information is disclosed. The method comprises identifying a carrier frequency stored within the wireless communication device. The method further comprises determining a direct current (DC) subcarrier associated with the carrier frequency. The method further comprises synchronizing with the DC subcarrier to obtain channel information, wherein the channel information comprises a channel size and a DC subcarrier offset. The method further comprises processing the DC subcarrier with the DC subcarrier offset to determine a starting frequency of a frequency band associated with the carrier frequency.

A wireless communication device to facilitate determination of frequency band information comprises a processing system and a wireless communication transceiver. The processing system is configured to identify a carrier frequency stored within the wireless communication device and determine a direct current (DC) subcarrier associated with the carrier frequency. The wireless communication transceiver is configured to synchronize with the DC subcarrier to obtain channel information, wherein the channel information comprises a channel size and a DC subcarrier offset. The processing system is configured to process the DC subcarrier with the DC subcarrier offset to determine a starting frequency of a frequency band associated with the carrier frequency.

A computer apparatus to facilitate determination of frequency band information comprises software instructions and at least one non-transitory computer-readable storage medium storing the software instructions. The software instructions are configured, when executed by a wireless communication device, to direct the wireless communication device to identify a carrier frequency stored within the wireless communication device, and determine a direct current (DC) subcarrier associated with the carrier frequency. The software instructions are further configured to direct the wireless communication device to synchronize with the DC subcarrier to obtain channel information, wherein the channel information comprises a channel size and a DC subcarrier offset. The software instructions are further configured to direct the wireless communication device to process the DC subcarrier with the DC subcarrier offset to determine a starting frequency of a frequency band associated with the carrier frequency.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
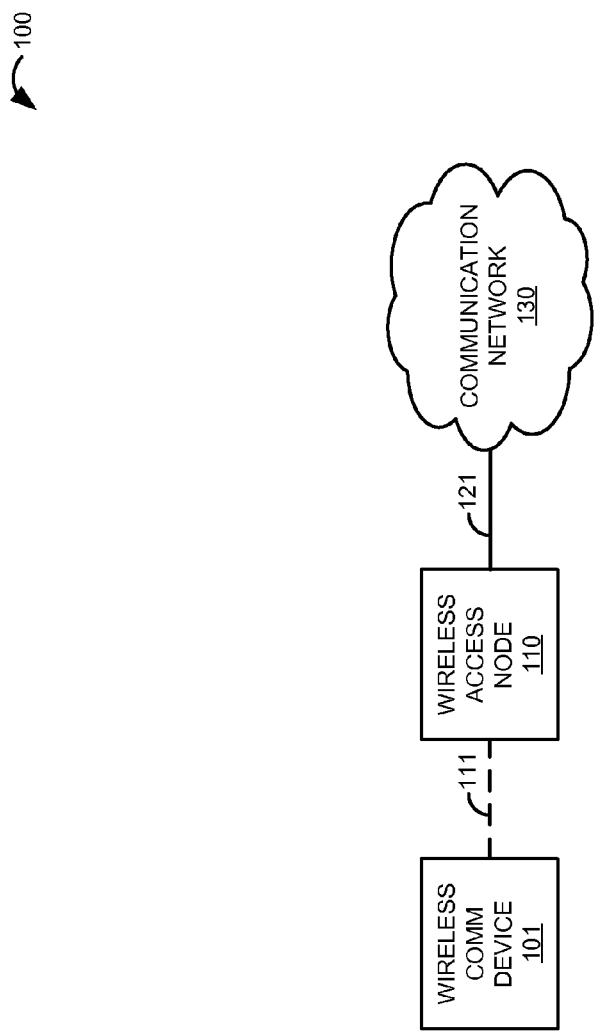
FIG. 1 is a block diagram that illustrates a communication system.

FIG. 1 is a block diagram that illustrates communication system 100. Communication system 100 includes wireless communication device 101, wireless access node 110, and communication network 130. Wireless communication device 101 and wireless access node 110 are in communication over wireless communication link 111. Wireless access node 110 and communication network 130 communicate over communication link 121.

Figure 2:
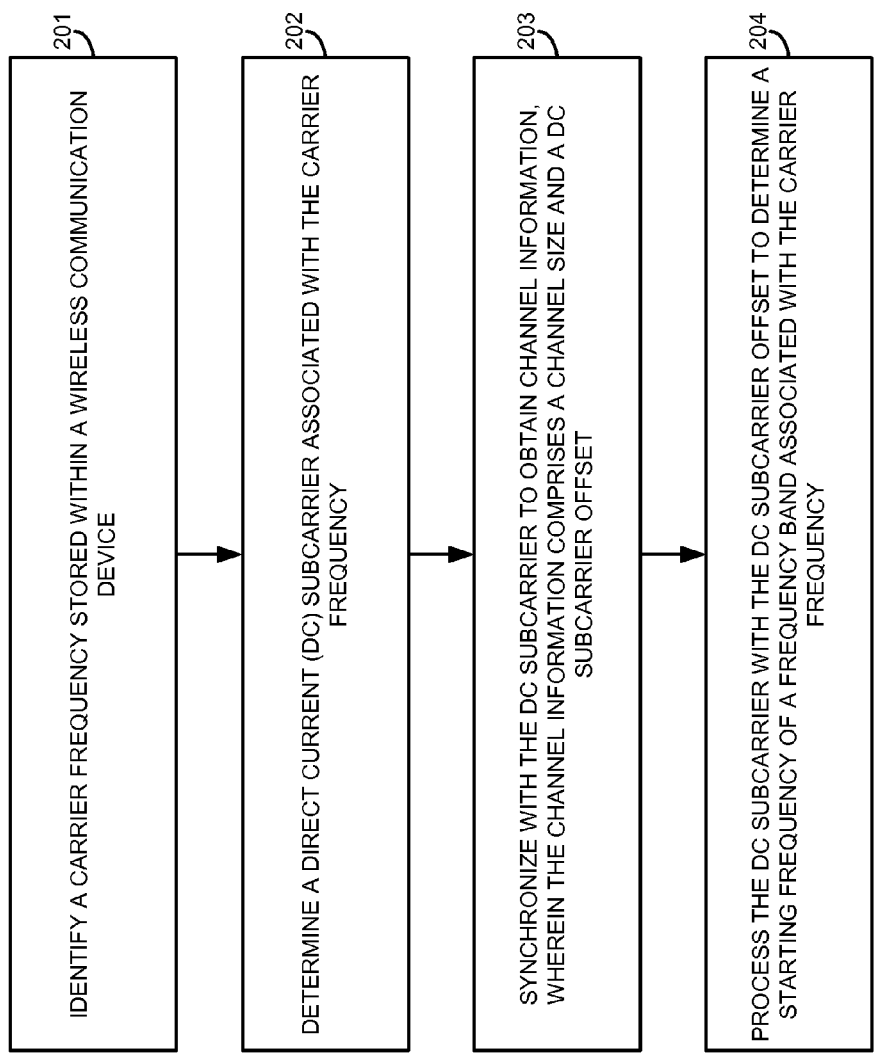
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by wireless communication device 101 to facilitate determination of frequency band information.

As shown in the operational flow of FIG. 2, wireless communication device 101 identifies a carrier frequency stored within wireless communication device 101 (201). Typically, wireless communication device 101 may have stored information about the available carrier frequencies and neighboring cell sites. In some examples, this stored information about carrier frequencies may be based on system information or any other information wireless communication device 101 has been programmed with and/or previously acquired. Wireless communication device 101 would typically refer to this stored information to identify a carrier frequency associated with a neighboring wireless access node 110.

Wireless communication device 101 determines a direct current (DC) subcarrier associated with the carrier frequency (202). Typically, to determine the DC subcarrier associated with the carrier frequency, wireless communication device 101 will first synchronize with the carrier frequency. Upon synchronizing with the carrier, wireless communication device 101 may detect the DC subcarrier for frequency synchronization. Although the DC subcarrier is typically associated with a center frequency of the frequency band associated with the carrier frequency, in this example, wireless communication device 101 does not assume that the DC subcarrier comprises a center frequency of the frequency band.

Instead, wireless communication device 101 synchronizes with the DC subcarrier to obtain channel information, wherein the channel information comprises a channel size and a DC subcarrier offset (203). Typically, wireless access node 110 broadcasts the channel information in an overhead message over an acquisition channel associated with the carrier frequency. The channel size informs wireless communication device 101 of the block size of the frequency band, which is typically three, five, or ten megahertz, although the channel size could comprise any value in some examples. As discussed above, since the DC subcarrier is not assumed to be centered in the frequency band, the DC subcarrier offset may be utilized by wireless communication device 101 to determine a starting frequency of the frequency band. For example, the DC subcarrier offset could indicate where the DC subcarrier is located in the frequency band relative to the starting frequency. In some examples, the DC subcarrier offset comprises a percentage of bandwidth of the frequency band that the DC subcarrier is removed from the starting frequency. Of course, the DC subcarrier offset could be expressed in different values and/or units and are within the scope of this disclosure.

Wireless communication device 101 processes the DC subcarrier with the DC subcarrier offset to determine a starting frequency of a frequency band associated with the carrier frequency (204). The frequency band could comprise an eight hundred megahertz frequency band in some examples. As discussed above, in some examples the DC subcarrier offset could comprise a percentage of bandwidth of the frequency band that the DC subcarrier is removed from the starting frequency. For example, if the channel size of the frequency band is ten megahertz, the frequency band spans from a starting frequency of 800 megahertz to an ending frequency of 810 megahertz, and the DC subcarrier is discovered at 803 megahertz, then the DC subcarrier offset could comprise a value of thirty percent, indicating that the DC subcarrier of 803 megahertz is removed thirty percent of the ten megahertz bandwidth of the frequency band from the starting frequency of 800 megahertz. Without knowing the starting frequency of 800 megahertz, wireless communication device 101 could still calculate the starting frequency based on the DC subcarrier value of 803 megahertz, the DC subcarrier offset of thirty percent, and the channel size of ten megahertz in this example. Note that other techniques could be employed to utilize the information expressed in the DC subcarrier offset and are within the scope of this disclosure.

In some examples, after determining the starting frequency of the frequency band, wireless communication device 101 could calculate the frequency band based on the channel size and the starting frequency. For example, according to the example described above, wireless communication device 101 could calculate the ending frequency of the frequency band to be 810 megahertz based on the starting frequency of 800 megahertz and the channel size of ten megahertz. In some examples, wireless communication device 101 could calculate the frequency band based on the channel size and the starting frequency by scanning energy using the channel size and the starting frequency to discover a plurality of different channels and sub-channels of the frequency band. Wireless communication device 101 would typically perform this search raster using one hundred kilohertz scans of energy along the frequency band beginning at the starting frequency, although other values could be used to perform this scanning in some examples.

Advantageously, wireless communication device 101 is able to determine a starting frequency of a frequency band associated with a carrier frequency stored within wireless communication device 101, even in situations where a DC subcarrier associated with the carrier frequency is not centered in the frequency band. By determining the DC subcarrier and synchronizing with it, wireless communication device 101 receives channel information that includes a channel size and a DC subcarrier offset. Based on processing the DC subcarrier and the DC subcarrier offset, wireless communication device 101 can calculate a starting frequency relative to the frequency band. In this manner, wireless communication device 101 may determine the span of the frequency band regardless of where the DC subcarrier falls within the channel.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNodeB), and others—including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication link 121 uses metal, air, space, optical fiber such as glass or plastic, or some other material as the transport medium—including combinations thereof. Communication link 121 could use various communication protocols, such as TDM, IP, Ethernet, telephony, optical networking, hybrid fiber coax (HFC), communication signaling, wireless protocols, or some other communication format—including combinations thereof. Communication link 121 may be a direct link or could include intermediate networks, systems, or devices.

Figure 3:
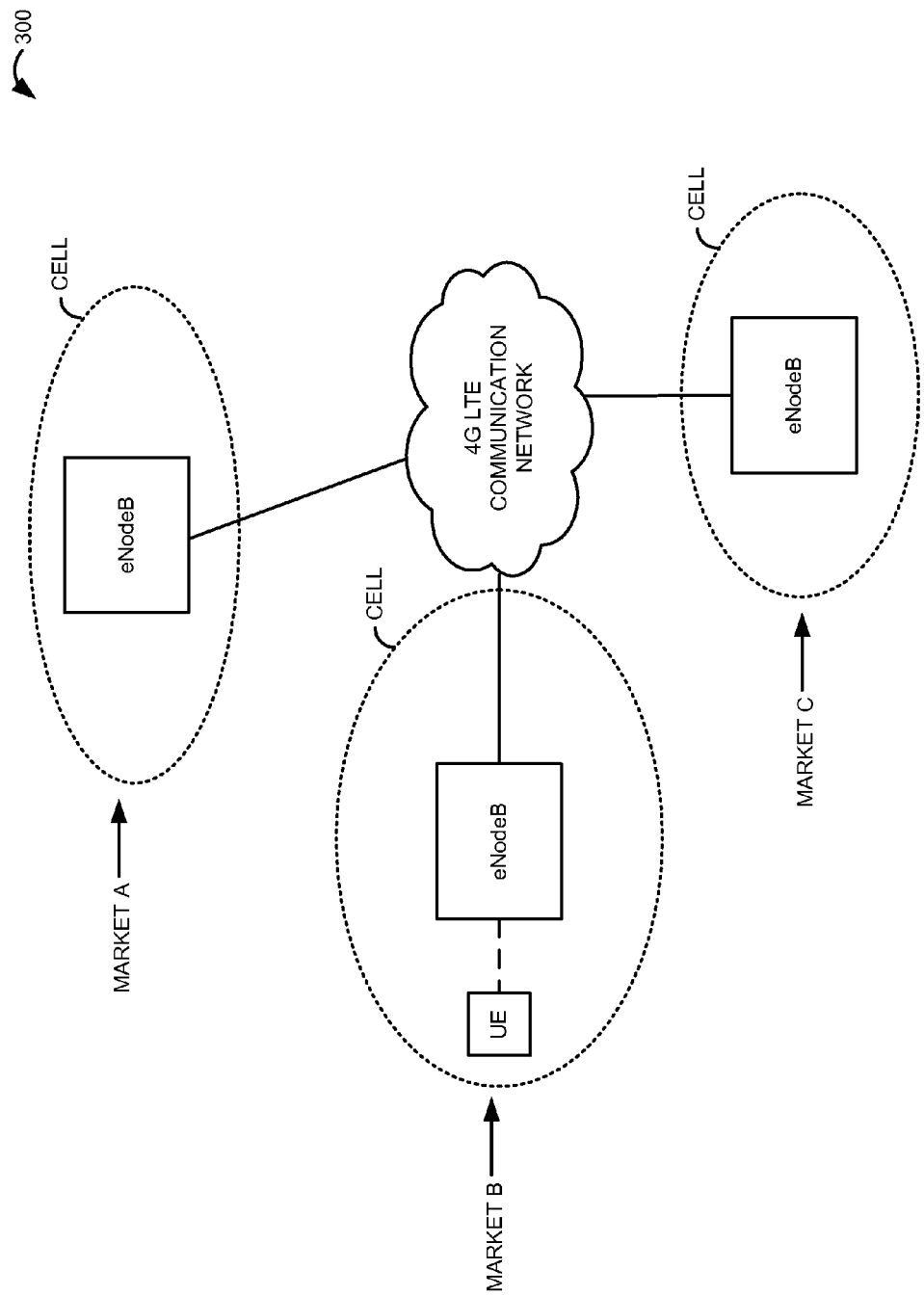
FIG. 3 is a block diagram that illustrates a communication system in an exemplary embodiment.
Figure 4:
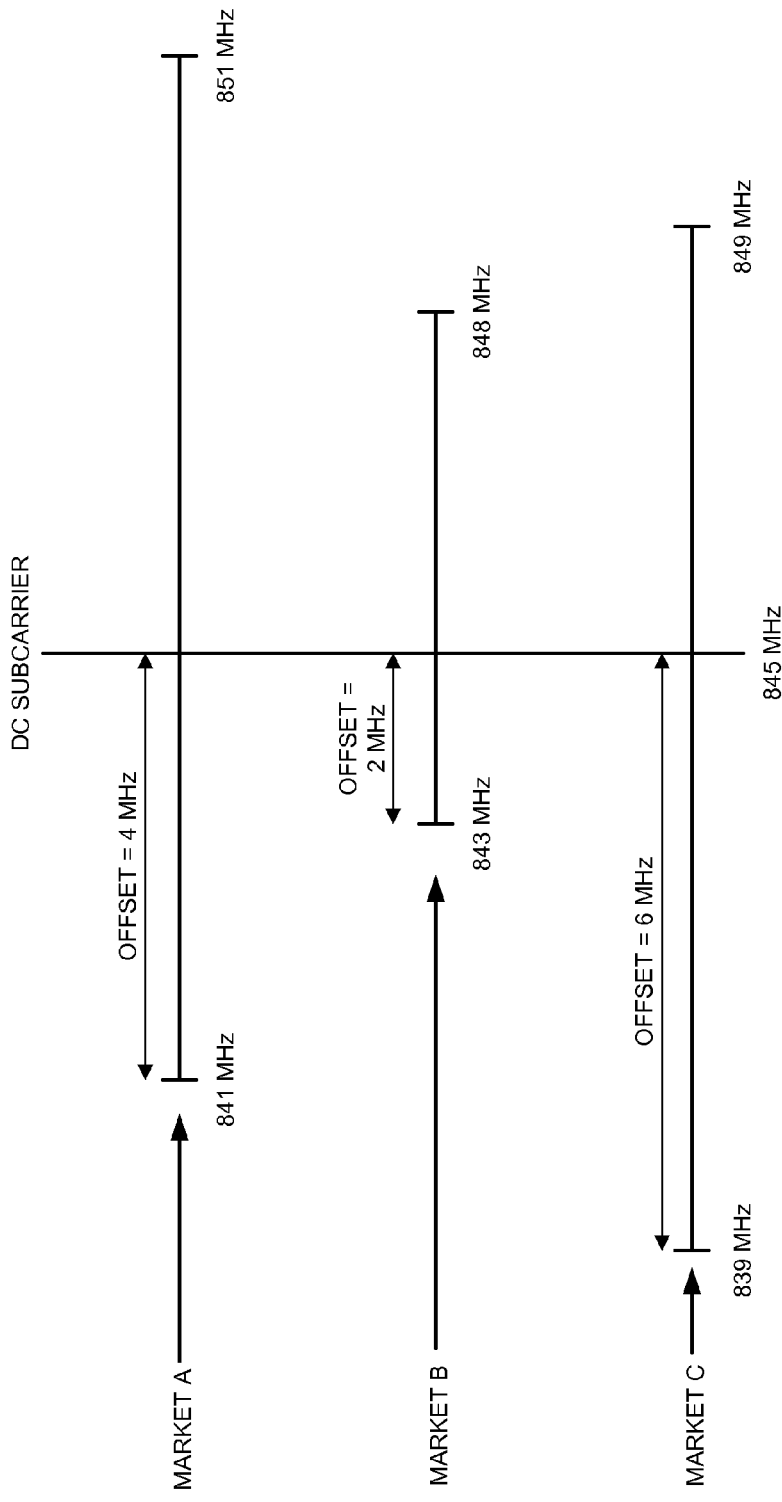
FIG. 4 illustrates frequency bands across different markets that share a common DC subcarrier.

FIG. 3 is a block diagram that illustrates long term evolution (LTE) communication system 300 in an exemplary embodiment. LTE communication system 300 includes three enhanced Node B (eNodeB) base stations that are in communication with a 4G LTE communication network. The eNodeB base stations provide examples of wireless access node 110, although node 110 may use alternative configurations. 4G LTE communication network could include a mobility management entity (MME), serving gateway (SGW), packet data network gateway (PGW), and other network elements typically found in a 4G LTE communication network. Each eNodeB has a wireless coverage area with approximate boundaries as indicated by the dotted lines encircling each respective eNodeB, which are typically defined by their signal propagation characteristics and coverage capabilities. LTE communication system 300 also includes a user equipment (UE) device which is shown as being served by one of the eNodeB base stations. The cell surrounding the eNodeB could be referred to as a serving cell for the UE located within it. In this example, the cell provided by the eNodeB serving the UE is designated "Market B", while the other cells are designated "Market A" and "Market C", all of which correspond to their respective markets as indicated in FIG. 4.

In operation, when the UE is first powered on, the initial connectivity for the UE requires it to synchronize with the network as a first step in gaining access to network resources. Typically, upon initial power up, the UE checks if it is possible to camp on the last registered public land mobile network (PLMN). If there is no PLMN previously stored in the UE, it will perform initial cell selection. For initial cell selection, the UE first scans all RF frequencies and detects the operating frequency with the strongest reference signal receive power (RSRP). The UE then has to synchronize with the network at the frame and slot level. The eNodeB continuously broadcasts a primary synchronization signal (PSS) and a secondary synchronization signal (SSS). The PSS is responsible for slot synchronization and the SSS is utilized for frame synchronization, and these signals are typically sent at the last orthogonal frequency-division multiplexing (OFDM) symbol of the first and eleventh slot of each frame. Thus, the UE detects the PSS for signal timing and the SSS for radio frame timing. Using both of these signals, the UE can derive the physical cell identifier of the corresponding cell.

The eNodeB also periodically transmits data in the form of a master information block (MIB) and several system information blocks (SIBs). Once the UE synchronizes with the network, it receives and processes the MIB from the eNodeB. The MIB includes system information in the form of a limited number of parameters that are needed by the UE to acquire other information from the cell, including a PLMN identifier, tracking area identifier, cell identifier, channel bandwidth, system frame number, physical hybrid automatic repeat request (HARQ) indicator channel (PHICH), and the capabilities of the radio access network and core network.

After processing the MIB, the UE reads the SIB1 and SIB2 information blocks which carry important information for the UE to select a cell. In particular, SIB1 contains parameters related to cell access and the scheduling of other SIBs, while SIB2 includes configurations for common and shared channels, including random access channel (RACH) configurations. The UE receives and processes the information in SIB1 and SIB2 and achieves synchronization with the network in the downlink direction.

In the typical implementation of 4G LTE networks, a DC subcarrier is defined for OFDM on the downlink and assists the UE in locating the center of the OFDM frequency band. This is commonly achieved by powering on the UE which proceeds to search for an operating frequency with a suitable DC subcarrier with the strongest RSRP. Since the DC subcarrier is commonly assumed to be centered in the frequency band, the UE can calculate the licensed band using only the channel size and the DC subcarrier frequency. This is typically accomplished by dividing the channel size by two and subtracting this quotient from the DC subcarrier center frequency to find the beginning of the frequency band. However, if the DC subcarrier is not centered in the frequency band, this technique of calculating the frequency band will not work. In this case, a DC subcarrier offset is also needed to indicate to the UE where in the frequency band the DC subcarrier is located. Some examples of how a non-centered DC subcarrier and corresponding offsets for different markets could be used to calculate their frequency bands will now be described with respect to FIG. 4.

FIG. 4 illustrates frequency bands across different markets that share a common DC subcarrier. As discussed above, markets A, B, and C correspond to their respective cells provided by the three separate eNodeB base stations shown in the 4G LTE communication system 300 of FIG. 3. In this example, the DC subcarrier is transmitted at 845 megahertz, which is not centered in any of the licensed frequency bands of markets A, B, and C. In particular, the channel size of market A is a ten megahertz block spanning from 841 megahertz to 851 megahertz, market B has a five megahertz channel size spanning from 843 megahertz to 848 megahertz, and market C is a ten megahertz block spanning from 839 megahertz to 849 megahertz.

In operation, after the UE synchronizes with the DC subcarrier, the UE receives an overhead message that is broadcast in an acquisition channel for each of the markets. Typically, the overhead message broadcast by the acquisition channel only tells the UE the channel size of its associated frequency band, which is ten megahertz for markets A and C and five megahertz for market B in this example. However, in this case, the overhead message also informs the UE of the DC subcarrier offset, which is needed for the UE to determine the starting frequency of the frequency band. In this example, the DC subcarrier offset broadcast in the overhead message for market A is four megahertz, the DC subcarrier offset for market B is two megahertz, and the DC subcarrier offset for market C is six megahertz. With knowledge of the DC subcarrier frequency, channel size, and the DC subcarrier offset, the UE is able to calculate the starting and ending frequencies of each respective frequency band. For example, in market A, the UE can subtract the four megahertz DC subcarrier offset from the 845 megahertz DC subcarrier frequency to determine the 841 megahertz starting frequency of the band, and then add the channel size of 10 megahertz to the 841 megahertz starting frequency to determine the 851 megahertz ending frequency of the frequency band. Similar calculations can be performed by the UE for markets B and C.

Once the frequency bands are calculated, the UE typically performs a search raster of one hundred kilohertz scans of energy over the entire frequency band. Within the one hundred kilohertz search raster the UE commonly checks for three different PSS sequences at every possible frequency that is implemented in the UE. The search raster typically begins at the starting frequency and attempts to discover different channels and sub-channels along the entire frequency band. During this process, the UE may discover several sectors within the corresponding cell, with each of the sectors having several of the one hundred kilohertz scans of energy.

Figure 5:
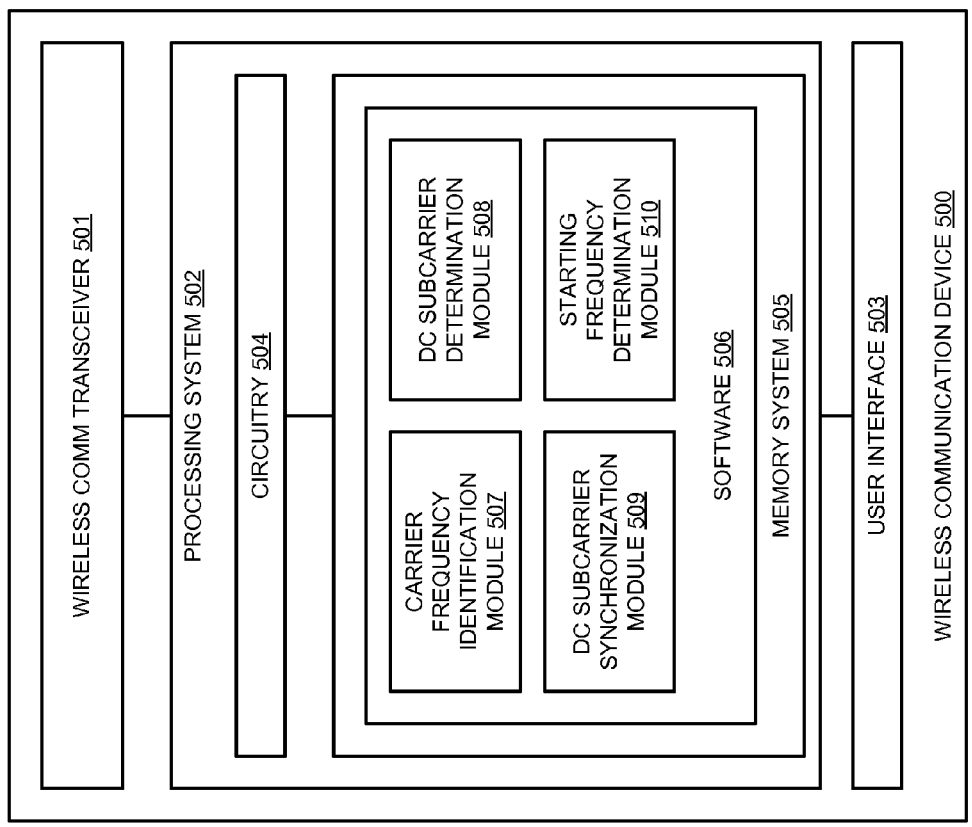
FIG. 5 is a block diagram that illustrates a wireless communication device.

FIG. 5 is a block diagram that illustrates wireless communication device 500. Wireless communication device 500 provides an example of wireless communication device 101, although device 101 could use alternative configurations. Wireless communication device 500 comprises wireless communication transceiver 501, processing system 502, and user interface 503. Processing system 502 is linked to wireless communication transceiver 501 and user interface 503. Processing system 502 includes processing circuitry 504 and memory system 505 that stores operating software 506. Operating software 506 comprises software modules 507-510. Wireless communication device 500 may include other well-known components such as a battery and enclosure that are not shown for clarity. Wireless communication device 500 may comprise a telephone, computer, e-book, mobile Internet appliance, media player, game console, wireless network interface card, or some other wireless communication apparatus—including combinations thereof.

Wireless communication transceiver 501 comprises RF communication circuitry and an antenna. The RF communication circuitry typically includes an amplifier, filter, RF modulator, and signal processing circuitry. Wireless communication transceiver 501 may also include a memory system, software, processing circuitry, or some other communication device. Wireless communication transceiver 501 may use various protocols, such as CDMA, GSM, UMTS, HSPA, EV-DO, EV-DO rev. A, 3GPP LTE, LTE Advanced, WiMAX, Wi-Fi, Bluetooth, Internet, telephony, or some other wireless communication format. Wireless communication transceiver 501 may be configured to synchronize with a direct current (DC) subcarrier to obtain channel information, wherein the channel information comprises a channel size and a DC subcarrier offset.

User interface 503 comprises components that interact with a user to receive user inputs and to present media and/or information. User interface 503 may include a speaker, microphone, buttons, lights, display screen, touchscreen, touch pad, scroll wheel, communication port, or some other user input/output apparatus—including combinations thereof. User interface 503 may be omitted in some examples.

Processing circuitry 504 comprises microprocessor and other circuitry that retrieves and executes operating software 506 from memory system 505. Processing circuitry 504 may comprise a single device or could be distributed across multiple devices—including devices in different geographic areas. Processing circuitry 504 may be embedded in various types of equipment. Processing circuitry 504 is typically mounted on a circuit board that may also hold memory system 505 and portions of wireless communication transceiver 501 and user interface 503. Memory system 505 comprises a non-transitory computer readable storage medium, such as a disk drive, flash drive, data storage circuitry, or some other hardware memory apparatus. Memory system 505 may comprise a single device or could be distributed across multiple devices—including devices in different geographic areas. Memory system 505 may be embedded in various types of equipment. In some examples, a computer apparatus could comprise memory system 505 and operating software 506. Operating software 506 comprises computer programs, firmware, or some other form of machine-readable processing instructions. Operating software 506 may include an operating system, utilities, drivers, network interfaces, applications, or some other type of software. In this example, operating software 506 comprises software modules 507-510, although software 506 could have alternative configurations in other examples.

When executed by processing circuitry 504, operating software 506 directs processing system 502 to operate wireless communication device 500 as described herein for wireless communication device 101. In particular, operating software 506 directs processing system 502 to identify a carrier frequency stored within wireless communication device 500. Operating software 506 further directs processing system 502 to determine a direct current (DC) subcarrier associated with the carrier frequency. In addition, operating software 506 directs processing system 502 to direct wireless communication transceiver 501 to synchronize with the DC subcarrier to obtain channel information, wherein the channel information comprises a channel size and a DC subcarrier offset. Operating software 506 further directs processing system 502 to process the DC subcarrier with the DC subcarrier offset to determine a starting frequency of a frequency band associated with the carrier frequency.

In this example, operating software 506 comprises a carrier frequency identification software module 507 that identifies a carrier frequency stored within wireless communication device 500. Additionally, operating software 506 comprises a DC subcarrier determination software module 508 that determines a direct current (DC) subcarrier associated with the carrier frequency. Operating software 506 also comprises a DC subcarrier synchronization software module 509 that synchronizes with the DC subcarrier to obtain channel information, wherein the channel information comprises a channel size and a DC subcarrier offset. Finally, operating software 506 comprises a starting frequency determination software module 510 that processes the DC subcarrier with the DC subcarrier offset to determine a starting frequency of a frequency band associated with the carrier frequency.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device to facilitate determination of frequency band information, the method comprising:
   identifying a carrier frequency stored within the wireless communication device;
   determining a direct current (DC) subcarrier associated with the carrier frequency;
   synchronizing with the DC subcarrier to obtain a channel size and a DC subcarrier offset wherein the DC subcarrier offset comprises a percentage of bandwidth of the frequency band that the DC subcarrier is removed from the starting frequency; and
   processing the DC subcarrier with the DC subcarrier offset to determine a starting frequency of a frequency band associated with the carrier frequency.

2. The method of claim 1 further comprising calculating the frequency band based on the channel size and the starting frequency.

3. The method of claim 2 wherein calculating the frequency band based on the channel size and the starting frequency comprises scanning energy using the channel size and the starting frequency to discover a plurality of different channels and sub-channels of the frequency band.

4. The method of claim 1 wherein a wireless access node broadcasts the channel size and the DC subcarrier offset in an overhead message over an acquisition channel associated with the carrier frequency.

5. The method of claim 1 wherein the DC subcarrier offset indicates where the DC subcarrier is located in the frequency band relative to the starting frequency.

6. The method of claim 1 wherein the frequency band comprises an eight hundred megahertz frequency band.

7. A wireless communication device to facilitate determination of frequency band information, the wireless communication device comprising:
   a processing system configured to identify a carrier frequency stored within the wireless communication device and determine a direct current (DC) subcarrier associated with the carrier frequency; and
   a wireless communication transceiver configured to synchronize with the DC subcarrier to obtain a channel size and a DC subcarrier offset wherein the DC subcarrier offset comprises a percentage of bandwidth of the frequency band that the DC subcarrier is removed from the starting frequency;
   the processing system configured to process the DC subcarrier with the DC subcarrier offset to determine a starting frequency of a frequency band associated with the carrier frequency.

8. The wireless communication device of claim 7 further comprising the processing system configured to calculate the frequency band based on the channel size and the starting frequency.

9. The wireless communication device of claim 8 wherein the processing system configured to calculate the frequency band based on the channel size and the starting frequency comprises the processing system configured to scan energy using the channel size and the starting frequency to discover a plurality of different channels and sub-channels of the frequency band.

10. The wireless communication device of claim 7 wherein a wireless access node broadcasts the channel size and the DC subcarrier offset in an overhead message over an acquisition channel associated with the carrier frequency.

11. The wireless communication device of claim 7 wherein the DC subcarrier offset indicates where the DC subcarrier is located in the frequency band relative to the starting frequency.

12. The wireless communication device of claim 7 wherein the frequency band comprises an eight hundred megahertz frequency band.

13. A computer apparatus to facilitate determination of frequency band information, the apparatus comprising:
   software instructions configured, when executed by a wireless communication device, to direct the wireless communication device to identify a carrier frequency stored within the wireless communication device, determine a direct current (DC) subcarrier associated with the carrier frequency, synchronize with the DC subcarrier to a channel size and a DC subcarrier offset wherein the DC subcarrier offset comprises a percentage of bandwidth of the frequency band that the DC subcarrier is removed from the starting frequency, and process the DC subcarrier with the DC subcarrier offset to determine a starting frequency of a frequency band associated with the carrier frequency; and
   at least one non-transitory computer-readable storage medium storing the software instructions.

14. The computer apparatus of claim 13 further comprising the software instructions configured to direct the wireless communication device to calculate the frequency band based on the channel size and the starting frequency.

15. The computer apparatus of claim 14 wherein the software instructions configured to direct the wireless communication device to calculate the frequency band based on the channel size and the starting frequency comprises the software instructions configured to direct the wireless communication device to scan energy using the channel size and the starting frequency to discover a plurality of different channels and sub-channels of the frequency band.

16. The computer apparatus of claim 13 wherein a wireless access node broadcasts the channel size and the DC subcarrier offset in an overhead message over an acquisition channel associated with the carrier frequency.

17. The computer apparatus of claim 13 wherein the DC subcarrier offset indicates where the DC subcarrier is located in the frequency band relative to the starting frequency.

* * * * *